Patented Nov. 26, 1946

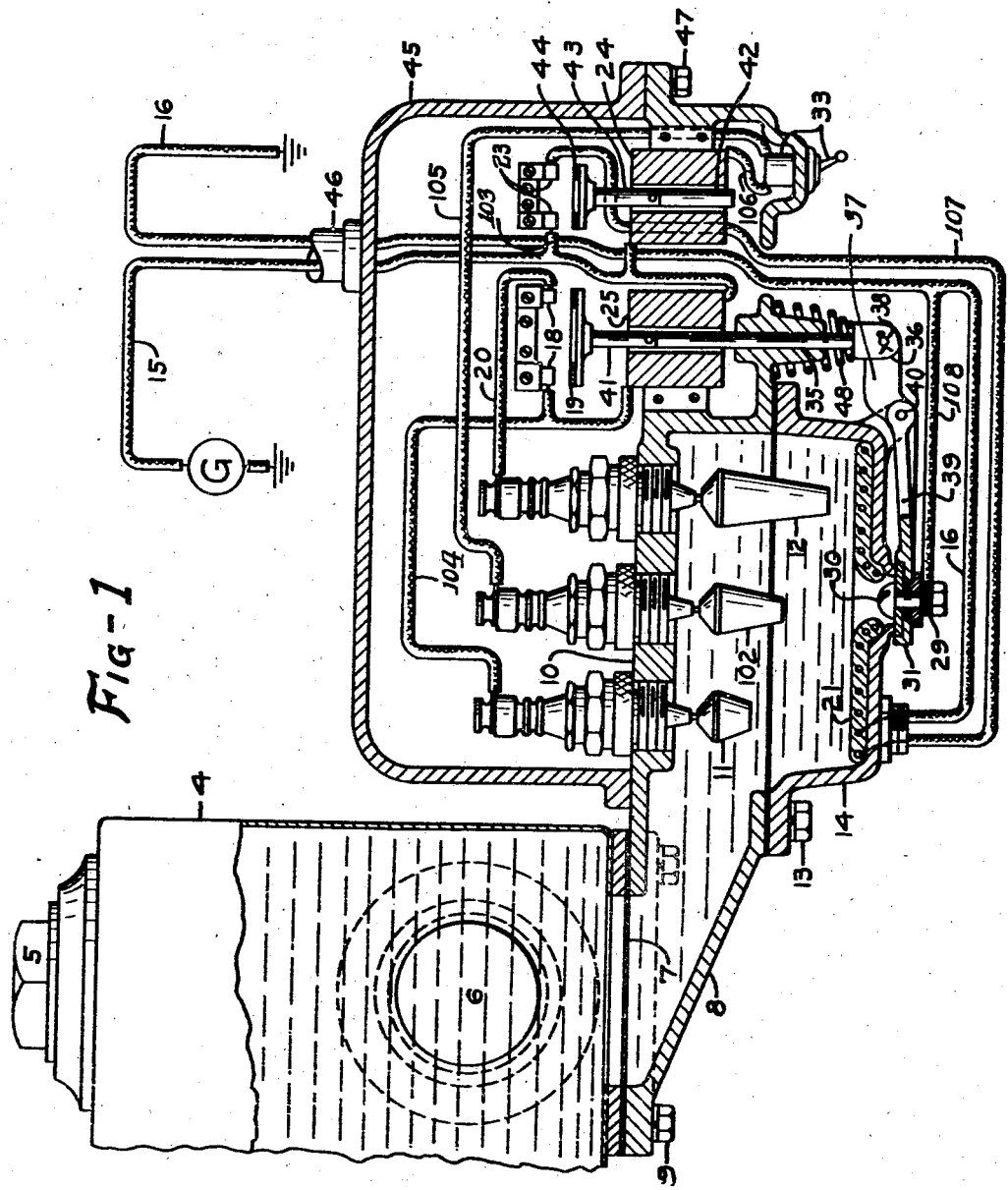

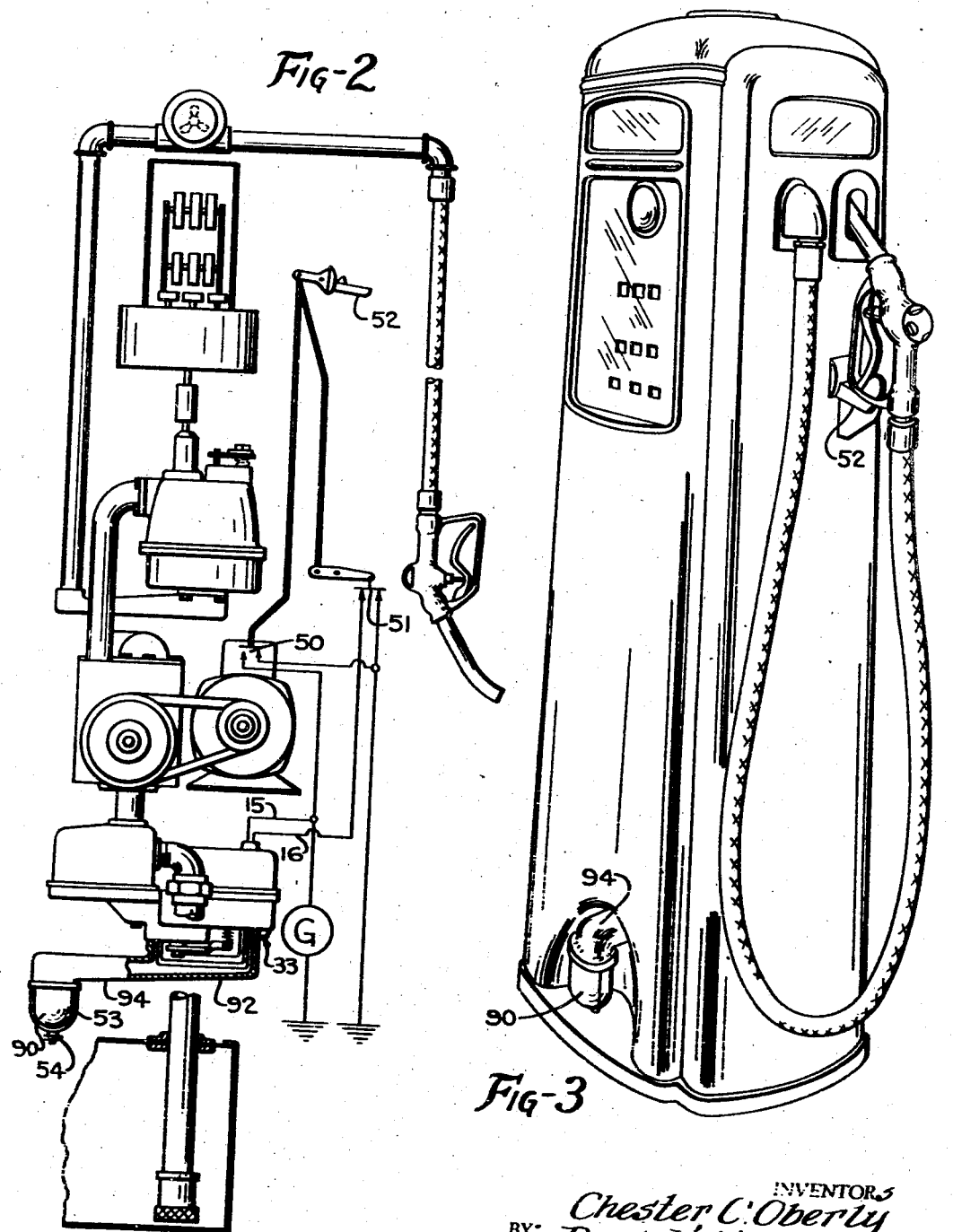

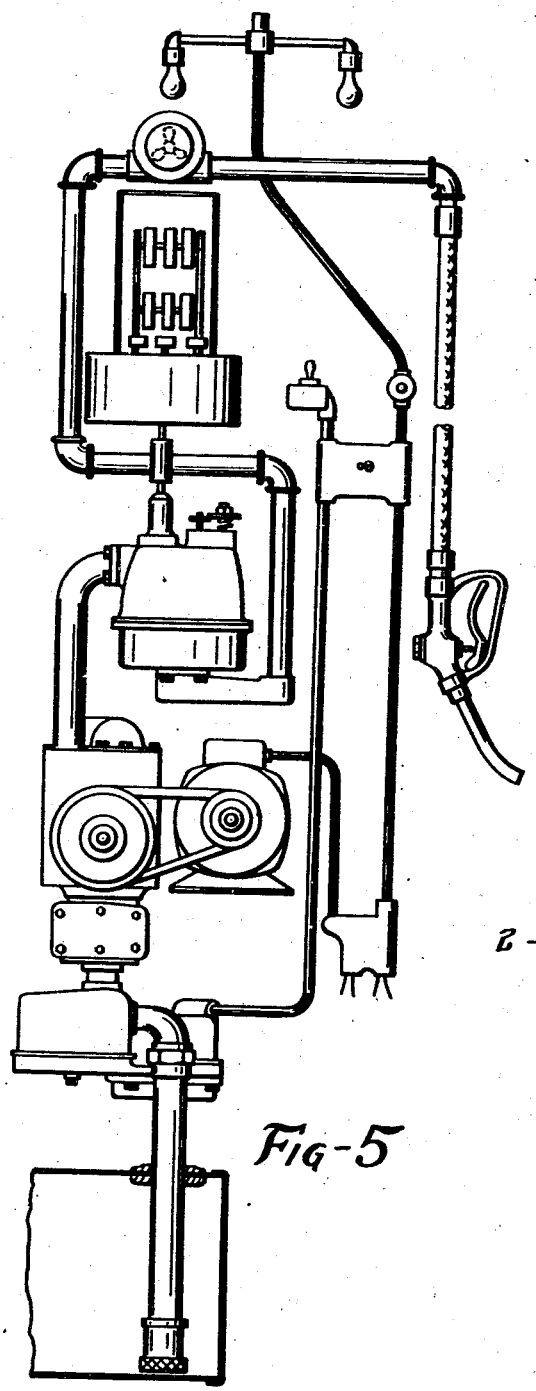
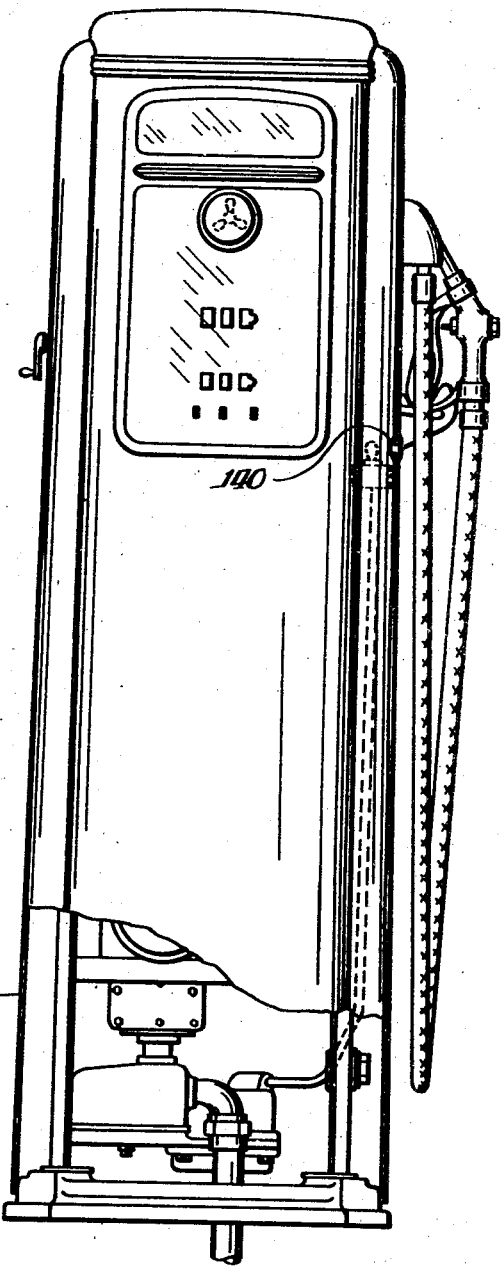
Fig-5
Fig-4
INVENTORS
Chester C. Oberly
BY: Paul E. Waugh
Cox & Moore ATTORNEYS

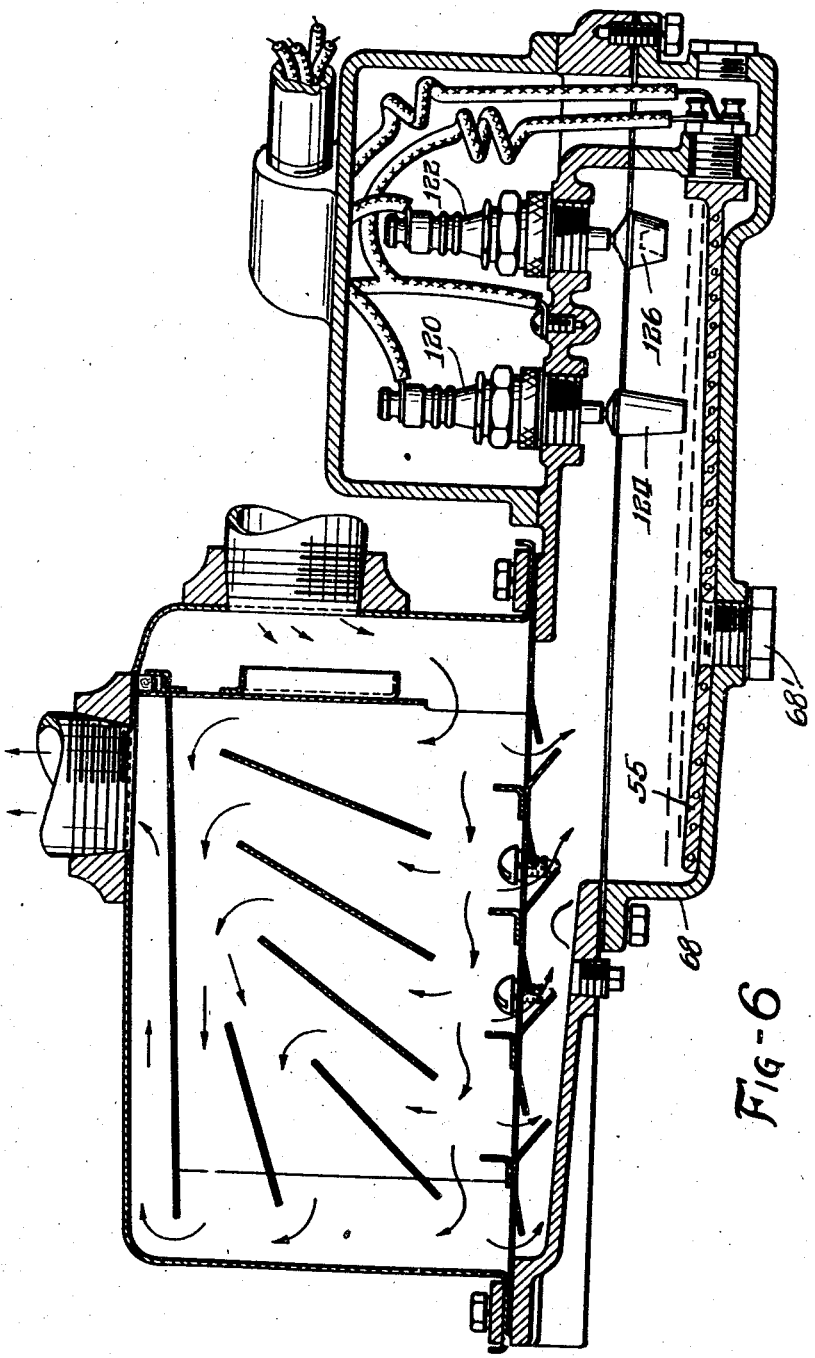

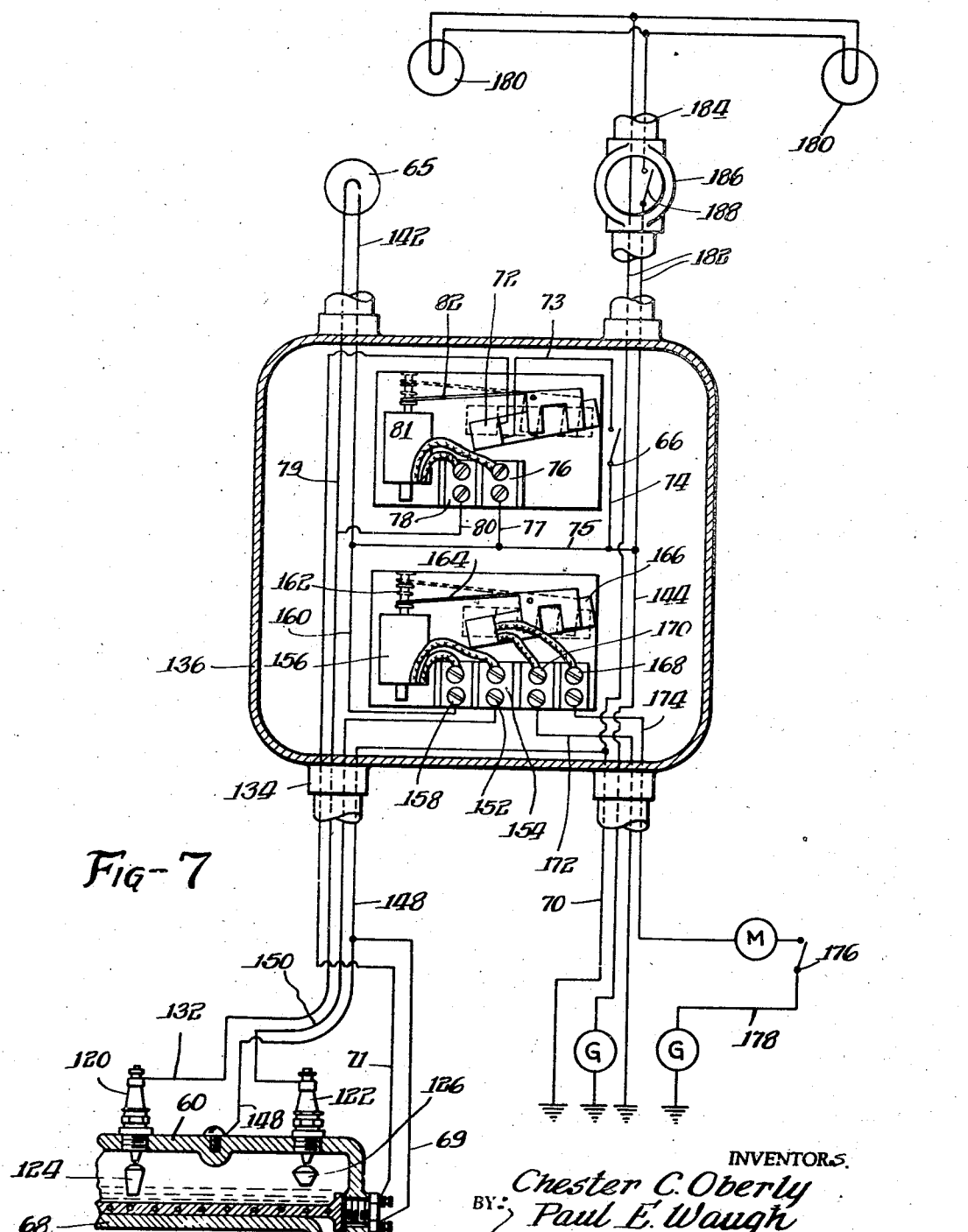

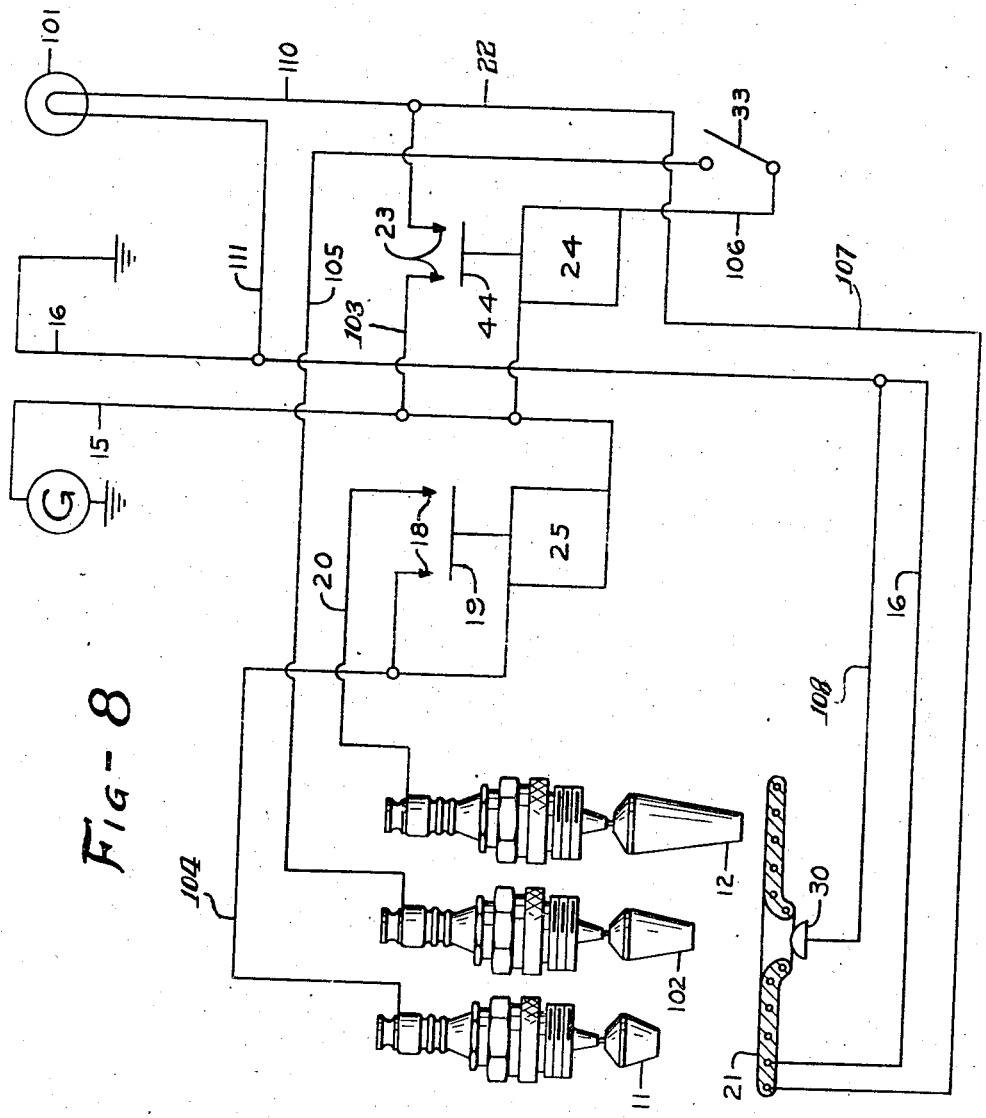

2,411,749

UNITED STATES PATENT OFFICE 2,411,749

ELECTRICALLY HEATED WATER TRAP FOR FUEL DISPENSING DEVICES

Chester C. Oberly and Paul E. Waugh, Fort Wayne, Ind., assignors to Tokheim Oil Tank and Pump Company, Fort Wayne, Ind., a corporation of Indiana Application August 9, 1939, Serial No. 289,258

8 Claims. (Cl. 222—1)

This invention relates to liquid dispensing devices and more particularly to devices for removing water from gasoline, petroleum products, and particularly motor fuel for internal combustion engines.

Heretofore in certain pending applications and patents it has been proposed to segregate or separate water from petroleum products and particularly to separate water from gasoline or other liquid fuel for internal combustion engines, either by means of float control devices or by electrically operated devices including electrodes energized by separated and accumulated water, but not energized by the motor fuel, such as gasoline. In the event that constructions like these prior devices were to be utilized in relatively cold places and particularly where the devices were utilized as service station pumps for continuously separating and removing water from the dispensed liquids, difficulties would be encountered due to the freezing of the water which would prevent proper operation of the devices.

Among the objects of the present invention are to provide de-icing or melting means for removing or melting ice that has been formed and also preventing the formation of further ice in water separating and/or liquid dispensing devices; to provide specifically electrically energized de-icing means for water separating and/or dispensing devices for separating and discharging water from petroleum products and liquid fuel for internal combustion engines; to provide de-icing mechanism of the foregoing character having a dump valve or discharge valve for automatically discharging the separated water from the liquid fuel wherein means is provided for automatically melting the ice formed from the separated or accumulated water and without the possibility of permitting the liquid fuel to escape during the de-icing and discharging of such melted ice; to provide an automatically operated safe, water separating device which will constantly indicate and/or automatically discharge separated and accumulated water from a liquid motor fuel in cold weather as well as in hot weather; to provide a service station pump, illustratively a conventional type of service station pump, which has provided in the flow line in advance of the liquid impelling pump a water separating and discharging and/or indicating device having means therein for automatically melting ice formed by accumulated water and for either automatically discharging the water without discharging the liquid fuel and/or indicating the presence of the water to permit it to be discharged manually by an attendant; to provide a water separating and de-icing mechanism for an apparatus for handling petroleum products including liquid fuel for internal combustion engines wherein electrically energized means is utilized not only for indicating and/or discharging separated and accumulated water from the liquid fuel but also wherein the source of electrical energy is utilized as a heating means in the separation chamber for heating ice formation therein and in such a manner that the melted ice will be automatically discharged without permitting the discharge of liquid fuel; to provide these and other objects of invention as will be apparent from a perusal of the following specification when taken in connection with the accompanying drawings wherein:

Figure 1 is a cross sectional view of the automatic drain valve mechanism attached to a petroleum storage tank.

Figure 2 is a schematic drawing showing the system associated with the gasoline dispensing device.

Figure 3 is a perspective view of a gasoline pump to which the device is applied.

Figure 4 is a view of a conventional service station pump provided with the de-icing mechanism shown in Fig. 6.

Figure 5 is a diagrammatic view of the mechanism enclosed within the casing of the service station pump shown in Fig. 4.

Figure 6 is a modified form of the device wherein the heating element is positioned in the bottom of the sump, provision being made for the manual discharge of water in lieu of automatic discharge, as in Fig. 1, the device being of the construction shown in the Chester C. Oberly application, Serial No. 253,486, filed January 30, 1939, Patent 2,259,771, of October 21, 1941.

Figure 7 is a detail of the electrical connections for the device shown in Fig. 6.

Figure 8 is a detail of the wiring diagram of the construction shown in Fig. 1.

In the present invention, for purposes purely of exemplification and not by way of limiting the adaptation of the invention, it has been shown as applied to the construction of my prior application for a water separator and discharge mechanism, Serial No. 266,225, filed April 5, 1939, Patent 2,325,925, of August 3, 1943, and also to the construction of application, Serial No. 253,486, filed January 30, 1939, Patent 2,259,771, of October 21, 1941.

As set forth in said application, Serial No.

253,486, the water which accumulates in underground metal gasoline tanks in the presence of gasoline causes a formation of a certain corrosion product which appears dispersed in the gasoline as a grayish green slime and which upon analysis is shown to be iron oxide 78.52 per cent and water combined with organic matter 14.11 per cent.

Minute particles of this corrosion product become entrained in gasoline drawn through the dispensing line and these minute particles have a peculiar affinity for water which separates out from the gasoline as the gasoline passes through the water separator. Consequently, the water which separates out in the bottom of the separation chamber carries in finely dispersed form, minute particles of this iron oxide.

Referring now to Fig. 1 of the present drawings, the device therein shown shows a storage tank for petroleum products including gasoline and/or other liquid fuel particularly adapted for use in internal combustion engines. This storage tank is provided with a fill cap 5 and a discharge outlet 6. In addition, attached somewhat to the bottom of the tank and communicating by means of a port 7, is a base casting 8 forming a portion of a sump or water separating and accumulating chamber. If desired, the sump may be made a part of the tank 4. The casting 8 is attached to the tank 4 by means of cap screws 9. In the portion 10 of the casting 8 three electrodes 11, 12 and 102 are threadedly engaged in spaced apart relation and insulated from the casting 8 and from each other. One of the electrodes 12, extends downwardly into the tank or sump a considerable distance below the others. To the base of the casting 8 by means of cap screws 13 a sump 14 is attached whereby the sump 14 may be bodily removed for repair purposes and for access to electrodes if desired.

In the present instance I have illustrated my invention as applied to an electrode-operated form of device for discharging accumulated water and for indicating the presence of accumulated water.

Referring to Figs. 1 and 8 for an explanation of the construction and electrical hook-up, the positive wire 15 is connected to a source of electrical energy designated by the letter G representing a generator, if desired. The electrode 11 connects by means of wire 104 to fixed switch contacts 18 adapted to be engaged by a solenoid shifted switch blade 19, hereinafter referred to. One of the switch contacts 18 connects to wire 104 and the other switch contact 18 connects by means of wire 20 to the electrode 12.

Disposed in the bottom of the sump 14 is an electrical heater 21, the body of which is formed of proper insulating material and has embedded therein the heating wires. One end of the heating wires connects by means of a suitable fitting directly to the wire 16 and the other end of the heating wire connects by means of wire 107 to one of the two fixed contacts 23. These contacts are adapted to be bridged or made by a shiftable contact 44 hereinafter referred to which, in turn, is actuated by a solenoid 24. The other fixed contact 23 connects by means of a wire 103 to the wire 15. The same wire 15 also connects to the solenoids 24 and 25. The wire 104 from the electrode 11, in addition to connecting with one of the switch contacts 18, likewise connects to solenoid 25. Electrode 102 is connected to a manually operated switch 33 by means of a wire 105. The wire 106 connects this same switch 33 to the solenoid 24.

It will be noted that the heating element 21 is plate-like in formation, and is provided with a central opening preferably of sufficient size to correspond to and register with the valved water discharge opening for the bottom of the sump. The solenoid 25 has a central core 35 which serves as a connecting rod to a clevis 36 hingedly connected to one arm of the lever arm 37 by means of a pin 38. Arm 37 is a continuation of the lever 39 on the end of which is located discharge valve 31. This valve lever is pivoted on pin 40 in turn supported by the casting 14. A compression spring 48 is disposed between the clevis 36 and the casting 8 and tends to keep the valve normally closed and the core withdrawn from the solenoid. Attached to this core 35 is an insulated extension 41 which supports the switch contact bar 19 for cooperation with the hereinbefore mentioned spaced switch points or contacts 18. The solenoid 24 has a core 42, the upper end of which has an insulated extension 43 supporting the switch bar 44 for engaging spaced-apart switch points or contacts 23.

On the upper end of the casting 8 is provided a cover 45 for the electrical control elements and for the wires 15 and 16 which pass therethrough and through the conduit 46. The cover is preferably attached to the base by means of screws 47. The water discharge valve 31 has mounted thereon an electrode 30 which is insulated from the valve and which, when the valve is closed, is disposed concentrically within and spaced from the casting 14 and from the heating element 21, as shown clearly in Fig. 1. This valve construction is shown as claimed broadly in my prior application, Serial No. 266,225, now Patent No. 2,325,925, of August 3, 1943. The central electrode 30 on the valve is connected by means of wire 108 to wire 16.

Referring now to Fig. 8, which is identical with Fig. 1, for the wiring circuits, except for the signal light which will be hereinafter referred to, it is to be understood that in the operation of the device as a water separator and accumulator for the purpose of indicating the presence of water or for manually or automatically discharging the accumulated water without discharging the petroleum product, utilization is made of the fact that the separated water because of its heavier specific gravity will settle and collect in the lowest portion of the containing vessel, with the petroleum product or gasoline which is of lighter specific gravity, overlying in a distinct layer the water which is of heavier specific gravity. With this in mind, it will be seen that water which will thus separate out by gravity from the petroleum product will tend to accumulate in the sump 14 and the accumulated water will eventually rise until it reaches the electrodes. As the water accumulates, it will first contact the electrode 12, and then the electrode 102 before it contacts the electrode 11. No electrical circuit is made by the contact of the water with the electrode 12 because the contacts 18 and 19 are not engaged. When the water has risen so that it contacts the electrode 102, current will flow through wire 15, solenoid 24, wire 106, switch 33 and wire 105 to electrode 102, and then through the water, to electrode 30, thence through wire 108, and wire 16 to ground. During winter months the switch 33 is closed and forms a closed circuit for the automatic operation of the heater means. When the ice formed in the tank contacts the electrode 102 the electrical heater circuit is closed by the ice contact between the electrodes 30 and 102. The solenoid 24 is thereby energized to shift the contact 44 into engagement with the fixed contacts 23. By closing of this switch the circuit to the heater 21 is closed and this allows the full voltage of the line to be applied to the heating element 21. This circuit is completed from wire 15, through wire 103, switch contacts 23 and 44, wire 107, the heating element 21 and wire 16 to ground. Since the heater is now energized, any ice formation present in the sump will be immediately melted.

The water or ice in the sump will continue to accumulate until it reaches the electrode 11 which closes another circuit controlling the discharge valve 31. This circuit extends from wire 15 through solenoid 25, wire 104, electrode 11, and through the water to electrode 30 and from electrode 30 through wire 108 to the ground wire 16. This circuit energizes the solenoid 25 thereby closing the switch 18, 19 and opening the valve 31, thereby allowing the accumulated water to be discharged from the sump or chamber 14. This water will continue to drain until its level falls below the lower portion of the electrode 12, at which time the valve will close. It is to be understood that it is desired to have the longer electrode 12 maintain the circuit closed for holding the solenoid energized so that the discharge valve will be maintained open and the water may drain to the bottom of and below the lower electrode 12. In this way a substantial amount of water may be discharged at one time as distinguished from merely maintaining a fluctuating opening and closing of the discharge valve in the event that only one electrode 11 were used.

It must be apparent that the circuits shown in the wiring diagram of Figure 8 provide means whereby the heating element 21 is energized prior to the opening of the discharge valve 31 so that any ice which may have accumulated or formed will be melted before the valve is open whereby the melted ice will properly be discharged.

In this connection it is to be noted that by having the electrode 30 located in the center of the discharge valve 31 nothing but water can pass because in the event that the petroleum product such as gasoline attempts to drain through this valve opening the circuit cannot be maintained because the instant petroleum, which is generally a non-conductor of electricity, flows over the contact 30, the circuit therethrough will be broken, the system will be de-energized and the spring 48 will close the valve whereby to stop the discharge of liquid.

In Fig. 8 I have shown the wire 110 as connected to the wire 107 and the wire 111 as connected to the wire 16 whereby signal light 101, or any other signal will be operated whenever the heating element is energized and give warning that water is present in the separation chamber.

In Fig. 4 the signal light 101 is illustrated as showing through the transparent opening in the housing hereinafter referred to just beneath the stationary hookup where it will be seen by the operator when he either replaces the nozzle on the hook or removes the nozzle from the hook. In lieu of placing the signal light immediately below the nozzle hook, it may be placed in an aperture directly on the indicator dial so as to be observable by the operator when he uses the computing mechanism.

In Figs. 2 and 3 there is shown a conventional type of gasoline service station pump for dispensing liquid fuel for internal combustion engines and provided with the invention as set forth in Fig. 1. In this service station pump the wire circuit is composed of wires 15 and 16 connected to the main power circuit of the pump which, as is well known, includes the motor switch 50 and, in the present instance, a master control switch such as an additional safety switch 51. The cooperation of these two switches, together with the switch lever 52, which is the pump motor switch lever generally associated with a nozzle support, and together with the electric circuits operated in the manner shown in Fig. 1, provide a completely automatic and safe means usable in any kind of weather for automatically separating, and automatically discharging accumulated water from the liquid fuel. In Fig. 2 the conventional gasoline pump is shown as comprising a dispensing line having its lower end provided with a foot valve disposed in the gasoline reservoir and connecting to a water separating tank, the bottom portion of which is provided with the water accumulating sump, such as the sump 14, Fig. 1, and is provided with the electrodes and discharge valve and other circuit operating mechanisms and circuits of Fig. 1. The upper portion of the water separator is connected to a continuation of the dispensing line which leads to the inlet of a liquid forcing pump belt-driven by the electric motor shown to the right thereof. The discharge side of the liquid dispensing pump, in turn, by means of a continuation of the dispensing line, connects the inlet side of the meter shown directly above the motor driven pump. The discharge side of the meter comes from the bottom thereof and passes through a sight gauge and thence to the usual type of flexible hose which is shown at the upper right hand portion of Fig. 2 and also in Fig. 3 as provided with a valved nozzle. The meter shaft projecting from the upper portion of the meter, as is well known, is utilized to operate a volume and/or price register and, in the present instance, a computing register. The motor pump is shown as provided with the usual switch 50 and operating mechanism manually operable by means of the usual type of switch 52 which is hereinbefore described and is shown in Fig. 3 as associated with the usual type of stationary nozzle support. Fig. 3 shows the enclosing housing for encasing the mechanism shown in Fig. 2.

Figs. 2 and 3 show the devices used on a conventional type of service station pump, the bottom of a sump 92 being provided with a lateral extension 94 into which the water will drain by gravity and to an outlet in the bottom of this lateral extension 94 there is connected a glass bowl or receptacle 90 which is mounted on the outside of the housing and is therefore always in view. To this end the housing may be recessed or bent inwardly to accommodate this glass bowl. The bowl is held against the bottom plate or rim portion of the extension 94 by means of a yoke 53 and the thumb screw 54. Thus, for dumping the globe 90, it is readily detachable from the lateral extension 94 with which it has when attached a water-tight connection by means of any suitable gasket.

In Figs. 6 and 7 a further modification of the invention is shown wherein the same is applied to the construction shown in the application of Chester C. Oberly, Serial No. 253,486, now Patent 2,259,771. In this system the wiring is identical to that shown in the previous Oberly application with the addition of the heating element and its connecting wires. Referring to Figure 6 and to the wiring diagram in Fig. 7, the heating element 55 is shown as being disposed in the bottom of the sump 68. The wires 69 and 148 connect the heating element with the ground wire 70. A wire 71 connects the other side of the heating element to a mercury switch 72. A wire 73 leads on from the mercury switch 72 to a switch 66 which is similar to the switch 33 shown in Fig. 1 for interrupting the heating element during warm weather. During winter weather this switch is closed at all times. A wire 74 connects the switch to the wire 75. A connection block 76 is connected to wire 75 by wire 77 and another connection block 78 is connected to electrode wire 79 by a wire 80. Wires leading from the connection blocks 76 and 78 are connected to a solenoid 81 which, in turn, is connected to mercury switch 72 by the arm 82. With this electrical hook-up, whenever the signal light 65 is energized by the accumulation of water in the sump 68, the circuit completed by electrode device 120 energizes the solenoid 81 which, in turn, moves the switch 72 to closed position and this allows full line voltage to be applied to the heating element 55. Water would offer too great a resistance to have the heating element connected directly in circuit with the electrodes and the consequence would be insufficient current for the heating element.

The remainder of the electric wire diagram is identical with that shown in the Chester C. Oberly application, Serial No. 253,486, previously mentioned. In this device each of the electrode devices 120 and 122 preferably comprise a member received in a threaded opening in the upper wall portion 60 of the sump 68 and an electrode 124 or 126 positioned in the sump. The electrode 124 or 126 is preferably formed of copper plated with silver. The electrode 124 is longer than the electrode 126 and therefore extends to a lower point in the collecting chamber or sump 68. The electrode 126 is preferably provided with a frusto conical opening (see Figure 6) extending inwardly from its lower surface to increase the area of the electrically active face or surface of the electrode. The electrode of the device 120 is connected to the signal device or lamp 65 by a wire 79 hereinbefore mentioned, extending through a pipe 134 from the sump 68 and through the explosion proof switch housing 136 to the lamp 65 carried upon a suitable supporting bracket so positioned within the housing that this member 65 may be viewed through a window 140 in the side of the housing 2. The window 140 is preferably located adjacent the nozzle support lever so that the attendant necessarily must see the lamp when he places the nozzle on the support or removes the nozzle from the support. The lamp 65 is preferably of any well-known type which increases in brilliancy in accordance with the voltage across its terminal. The wire 79 is connected to one terminal of the lamp 65. The other terminal is connected by a wire 142 which extends into the explosion proof housing 136 and is connected to the undergrounded power wire 144 of the lighting circuit. The other and grounded wire 70 of the lighting circuit power supply is connected to the casing 60 of the separator as by wire 148 extending from the switch housing 136 through the pipe 134 and into the control chamber where it is connected with the upper wall portion 60 of the base casting 68. It will be evident from this description that as the level of water rises in the collecting chamber the voltage impressed across the signal device or lamp 65 will increase due to the shape of the electrode 124 and due to the decrease in electrical resistance between this electrode member and the walls of the sump 68 the brilliance of the warning given by the signal lamp 65 will therefore vary in proportion to the level of the water in the chamber.

The electrical control member 122 controls the de-energization of the pump driving motor. For this purpose the electrode device 122 is connected by wire 150 to the terminal 152 of a terminal block 154 in the explosion proof switch housing 136. The terminal 152 is in turn connected to one side of a solenoid 156 in this housing, the other side of the solenoid being connected to a terminal 158, connected by wire 160 to the undergrounded wire 144 of the power supply.

The solenoid 156 through its core 162 and the switch lever operated thereby controls a mercury switch 166. The contacts of the mercury switch 166 are connected to the terminals 168 and 170. The terminal 170 is connected to the wire 172 of the motor supply power line and the terminal 168 is connected by wire 174 in series with the pump driving motor and a master switch 176 which in turn is connected to the other wire 178 of the motor power supply. The master motor switch is controlled in the usual manner by the nozzle supporting lever 52, as previously described. It will be evident that the master switch 176 and the mercury switch 166 being closed, the pump motor will be energized to drive the pump and effect a dispensing of the gasoline when the nozzle valve is opened.

If the service station attendant ignores the warning given by the signal device or lamp 65 and if he permits the water to rise to such a level as to contact the electrode 126 sufficient current to energize the solenoid 156 will flow from the power wire 144 through the solenoid 156, wire 150, and through the electrode member 126 to the grounded supply wire 70 by the wire 148. Energization of this solenoid will cause an upward movement of its core 162 which, through the switch lever, will oscillate the mercury switch 166 thereby breaking the motor circuit and preventing further dispensing of gasoline until the water has been drained from the collecting sump 68.

The usual dial illuminating lamps 180 may be connected by the wires 182 extending through pipes 184 and switch housing 186 to the lighting circuit supply wires 144 and 70. The housing 186 encloses the usual manually operated light control switch 188 interposed in one of the wires 182.

It will be understood that in connection with the foregoing construction of Figs. 6 and 7 the water is manually removed by manually opening the discharge aperture in the sump 68, the discharge aperture being shown as closed by a suitable threaded plug 68'.

The invention is hereby claimed as follows:

1. In combination, a tank for holding a petroleum product containing water adapted to separate by gravity and to underlie said petroleum product in the tank and which water on freezing forms ice, said tank having a discharge port for water, a discharge valve for said port, means for opening said valve, electrode means carried by said valve, an electric heater disposed in said tank, heater control, electrode means in said tank adjacent the electrode means carried by said valve but spaced therefrom, electrode means disposed in said tank at an elevation above said heater control electrode means, and means including connections from said several electrode means to a source of current and to the heater to energize said heater to melt the ice and to open said valve to discharge only the water.

2. In combination, means forming a tank adapted to hold a petroleum product from which water is adapted to separate by gravity and lie in a stratum beneath said petroleum product, said water freezing at a low temperature to form ice in said tank, a source of electricity, a first electrode in said tank in spaced relation from the bottom of said tank, the bottom of said tank having a water discharge outlet, a valve for said outlet, a second electrode carried by said valve, a heater located at the bottom of said tank and a third electrode spaced from said second electrode carried by said valve, an electric valve actuator and electrical connections for passing current to said actuator from a source of electricity through said first electrode and through said water or ice to the valve carried electrode, and means in circuit with said source and said second and third electrodes and automatically operable prior to the opening of said valve for passing the current from said source directly through said heater whereby to energize the heater without passing said current through said water or ice.

3. In a device of the class described, the combination of means forming a tank adapted to carry a petroleum product containing water which is adapted to separate by gravity and flow to the bottom of said tank to form ice when frozen, means in said tank forming an electrode disposed above the bottom of said tank, means forming a source of current, a heater disposed at the bottom of said tank, an additional electrode disposed in the bottom of said tank, means for passing a current from said first mentioned electrode through the ice to the additional electrode, and means operative thereafter for passing the current from said source directly through said heater without traversing said second electrode and the ice.

4. In combination, a tank adapted to hold a petroleum product from which water is adapted to separate and accumulate beneath the petroleum product and form ice on freezing, the bottom of said tank having a water discharge outlet, a valve controlling said outlet, a first electrode carried by said valve and disposed within said tank when the valve is closed, means for moving said valve to closed position, an electric heater disposed on the bottom of said tank in spaced relation to the electrode carried by said valve when the valve is closed, a pair of additional electrodes disposed in said tank at different elevations above the bottom of said tank, a source of electric current, an electrically operated valve actuator, a relay, a circuit including said source, said relay, said first electrode, one of said additional electrodes and the water or ice between said electrodes, a circuit controlled by said relay for connecting said heater directly to said source independently of said first electrode and said one additional electrode and the water or ice between said electrodes, and a circuit including said first electrode, the other of said additional electrodes, the water between said electrodes and said valve actuator for moving said valve to open position permitting discharge of the water through said outlet.

5. In combination, a tank for holding a petroleum product containing water adapted to separate by gravity and to underlie said petroleum product in the tank and which water on freezing forms ice, said tank having a discharge port for water, a valve in said port and means for closing said valve, an electrically operated actuator for operating said valve, electrical heating means in the said tank, said electrical heating means being constructed to permit the passage of water to said discharge port of said tank, a first electrode mounted on said valve so as to have a portion thereof disposed within said tank when said valve closes the discharge port of said tank whereby said electrode may be contacted by ice or water in said tank, a second electrode depending in said tank and spaced above said first electrode, a third electrode disposed in said tank in spaced relation above said second electrode, a fourth electrode extending in said tank adjacent the bottom of the tank and below the second electrode, all of said electrodes being insulated from each other and from said tank, a source of current, a solenoid, a first switch operated by said solenoid, a second switch operated by said valve actuator, an electric circuit including said first and second electrodes, said solenoid and said source of current and energizing said solenoid upon contact of water or ice with said first and second electrodes, a circuit including said first switch and said heating means for energizing said heating means upon energization of said solenoid, a circuit including said first and third electrodes, said source and said valve actuator for energizing said actuator to open the valve upon contact of water or ice with said first and third electrodes, and a circuit controlled by said second switch and connecting said fourth electrode to said valve actuator in shunt to said third electrode for maintaining said actuator energized as the water discharges from said tank and until the petroleum product contacts said fourth electrode.

6. In a device of the class described, in combination with a container for a petroleum product, containing entrained water adapted to segregate and flow by gravity to underlie the petroleum product and there to congeal and form ice at low temperature, said container having a discharge port, means for closing said port, electrically operated means for melting said ice, electrically operated means for opening said port closing means to permit discharge of water through said port, and control devices connected to said port closing means and ice melting means and including means responsive to the level of water or ice in said container for energizing said electrically operated ice melting means, and means responsive to the level of water in said container for thereafter operating said electrically operated closure opening means.

7. In combination with a tank adapted to contain a body of liquid petroleum fuel and an underlying body of water, which latter congeals in said tank in cold weather, said tank having a water discharge outlet, closure means for said outlet, heating means associated with said tank, means operated by the water and ice upon accumulation of a predetermined volume of ice and water in said tank for energizing said heating means for melting at least a portion of such ice and means operated by the water and ice upon the accumulation of a predetermined greater volume of ice and water in said tank for opening said closure means to discharge water from said chamber.

8. In combination with a tank adapted to contain a body of liquid petroleum fuel from which water if entrained in said fuel has separated therefrom in an underlying body which may freeze in cold weather, said tank having an outlet adjacent the bottom thereof for discharging the separated water, a shiftable closure for said outlet, heating means positioned to supply heat to the separated ice or water in said tank, means operated by the separated water or ice in said tank when at a predetermined level in said tank for rendering said heating means effective to supply heat to the separated water or ice in said tank, and means operated by the water or ice in said tank as the level thereof in said tank varies with respect to said predetermined level for shifting said closure means to opened or closed positions.

CHESTER C. OBERLY.
PAUL E. WAUGH.